(12) United States Patent
Hediger et al.

(10) Patent No.: US 8,074,343 B2
(45) Date of Patent: Dec. 13, 2011

(54) METHOD FOR PRODUCTION OF SUPPORTING BASKET FOR AN END WINDING

(75) Inventors: Daniel Hediger, Othmarsingen (CH); Francesco Stallone, Locarno (CH)

(73) Assignee: ALSTOM Technology Ltd., Baden (CH)

( * ) Notice: Subject to any disclaimer, the term of this patent is extended or adjusted under 35 U.S.C. 154(b) by 36 days.

(21) Appl. No.: 12/610,428

(22) Filed: Nov. 2, 2009

(65) Prior Publication Data
US 2010/0066202 A1     Mar. 18, 2010

Related U.S. Application Data

(63) Continuation of application No. PCT/EP2008/054734, filed on Apr. 18, 2008.

(30) Foreign Application Priority Data

May 9, 2007 (CH) ....................... 0751/07

(51) Int. Cl.
*H02K 15/12* (2006.01)
(52) U.S. Cl. .......................... 29/596; 310/260
(58) Field of Classification Search ............... 29/596; 310/260; 427/58
See application file for complete search history.

(56) References Cited

U.S. PATENT DOCUMENTS

| 3,089,048 A | 5/1963 | Bahn et al. |
| 3,145,317 A | 8/1964 | Blohm et al. |

FOREIGN PATENT DOCUMENTS

| DE | 2231292 | 1/1974 |
| DE | 102004016454 | 10/2005 |
| JP | 59156133 A * | 9/1984 |
| WO | WO2008/138704 | 11/2008 |

OTHER PUBLICATIONS

Search Report for Swiss Patent App. No. 0751/2007 (Sep. 5, 2007).
International Search Report for PCT Patent App. No. PCT/EP2008/054734 (Aug. 17, 2009).

* cited by examiner

*Primary Examiner* — Livius R Cazan
(74) *Attorney, Agent, or Firm* — Cermak Nakajima LLP; Adam J. Cermak

(57) ABSTRACT

A method for the production of a supporting basket (1) for an end winding of a stator winding of an electrical machine includes preassembling the supporting basket (1), mounting electrically insulated round connectors (6) on the supporting basket (1), immersing the supporting basket (1) with the mounted round connectors (6) in an impregnation agent bath (12), evacuating the impregnation agent bath (12), and removing the supporting basket (1) with the mounted round connectors (6) from the impregnation agent bath (12), and drying, curing, or both, the impregnation.

3 Claims, 2 Drawing Sheets

METHOD FOR PRODUCTION OF SUPPORTING BASKET FOR AN END WINDING

This application is a Continuation of, and claims priority under 35 U.S.C. §120 to, International application no. PCT/EP2008/054734, filed 18 Apr. 2008, and claims priority therethrough under 35 U.S.C. §§119, 365 to Swiss application no. No. 00751/07, filed 9 May 2007, the entireties of which are incorporated by reference herein.

BACKGROUND

1. Field of Endeavor

The present invention relates to a method for production of a supporting basket with round connectors for an end winding of a stator winding of an electrical machine, and also relates to a supporting basket having round connectors for an end winding of a stator winding of an electrical machine.

2. Brief Description of the Related Art

Large electrical machines such as generators and electric motors which are used in power stations have a stator with an electrical stator winding. This stator winding is passed out of the stator, at least at one axial end of the stator, where it forms an end winding. An end winding such as this is formed in particular by end sections of conductors, which are in the form of bars, of the stator winding, which are angled in the radial direction and in the circumferential direction such that the end winding is in the form of a truncated cone, which widens as the distance from the associated end-face stator end increases. A supporting basket is normally provided in order to support the end winding. This supporting basket may have a plurality of supporting brackets which are distributed in the circumferential direction and are arranged radially externally on the end winding. An axial support for the end winding can be provided, for example, via these supporting brackets at the associated front-side end of the stator. A supporting basket such as this normally has one or two supporting rings, which extend in the circumferential direction and to which the supporting brackets are attached. In this case, the supporting rings can support the supporting brackets radially, and thus allow them to absorb radial supporting forces.

In order to allow the stator winding to be electrically connected to an electrical system, for receiving the current produced by a generator and/or for providing the current required by an electric motor, the winding bar sections of the end winding are electrically connected at their bar ends, in a complex, predetermined manner, to a plurality of so-called round connectors, which themselves form electrical connections to the end winding. The stator winding can be connected to the electrical system via these connections, which are formed with the aid of the round connectors. The round connectors which are used in this case must be electrically insulated and must also be impregnated, in order to prevent the ingress of moisture.

In principle, it is possible to insulate the round connectors wet or dry as individual parts, for the production of the end winding. Wet-insulated round connectors are likewise dried and cured as individual parts. Wet insulated ground connectors in principle do not require any impregnation. In contrast to this, dry-insulated round connectors must additionally be impregnated. To do this, it is in principle possible to impregnate the dry-insulated round connectors individually and then to dry and cure them. An appropriate impregnation tool can be used for this purpose. In the case of long round connectors, it may be necessary to mechanically separate them before dry insulation, then to impregnate them and only then to join them together again, for example by welded joints or soldered joints. The weld or solder points must then be locally wet-insulated and dried, and cured.

For fitting of the end winding, it is also necessary to fit the supporting basket to the respective stator end, that is to say, to fit the supporting brackets and the supporting rings to the stator end. The completely insulated, and possibly impregnated, round connectors can then be fitted to the supporting basket, using appropriate attachment devices for this purpose. When the round connectors are being fitted, they can be moved along the supporting brackets. In order to prevent damage to the insulation and impregnation during this process, wet cushions can be used here. After the round connectors have been fitted, the attachment devices that are used are also locally wet-impregnated. The associated drying and curing of these local impregnation points can be carried out, for example, in the course of a heat treatment of the stator. Overall, a production process such as this is comparatively complex.

SUMMARY

One of numerous aspects of the present invention deals with the problem of an improved embodiment for a production method of the aforementioned type and for a supporting basket having round connectors of the type mentioned initially, which embodiment is distinguished in particular by the capability to produce the end winding and the supporting basket easily.

Another aspect includes the general idea of first of all constructing the supporting basket independently of the stator, with supporting brackets, at least one supporting ring and all the round connectors, in order subsequently to impregnate a completely preassembled unit. The impregnation is in this case carried out by immersion in an impregnation agent bath and by evacuation of the impregnation agent bath. This results in high-quality impregnation which, in particular, avoids air enclosures in concealed areas. One particularly advantageous aspect of the proposed procedure is that a completely impregnated preassembled unit is created which can be fitted as such to the stator without having to carry out any further relative movements between the supporting brackets and the tubular connectors. The risk of damage to the impregnation and/or insulation as a result of relative movements between the supporting brackets and the round connectors can thus be reduced considerably.

A further advantage is that the respectively used attachment devices, by which the round connectors are attached to the supporting brackets, likewise form a component of the preassembled unit and are therefore also impregnated. This makes it possible to improve the robustness and stiffness of the supporting basket. This avoids the need for corresponding subsequent treatment by local wet impregnation. This is particularly advantageous with regard to the health of the fitters since they are not confronted with vapors from the wet impregnation agent.

Further important features and advantages of the present invention will become evident from the drawings and from the associated description of the figures on the basis of the drawings.

BRIEF DESCRIPTION OF THE DRAWINGS

Preferred embodiments of the invention are illustrated in the drawings and will be explained in more detail in the following description, in which the same reference symbols relate to the same, similar or functionally identical components. In the figures, in each case schematically:

FIG. 3 shows a section view corresponding to the section lines III in

FIG. 2,

DETAILED DESCRIPTION OF EXEMPLARY EMBODIMENTS

Figure 1:
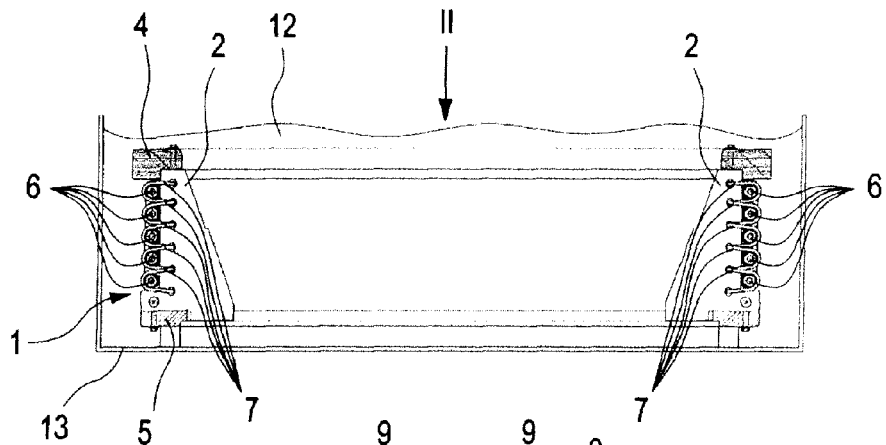
FIG. 1 shows an axially sectioned view of a supporting basket with round connectors in an impregnation bath.

As shown in FIGS. 1 to 6, a supporting basket 1 has a plurality of supporting brackets 2 which are arranged distributed in the circumferential direction with respect to a longitudinal center axis 3 of the supporting basket 1. Furthermore, the supporting basket 1 has at least one supporting ring 4 or 5. The embodiment shown in FIGS. 1 to 3 has two supporting rings 4, 5, while the embodiment shown in FIGS. 4 to 6 has only one supporting ring 4. The supporting brackets 2 are attached to the respective supporting ring 4, 5.

Furthermore, a plurality of round connectors 6 are attached to the supporting basket 1. These are arranged on the supporting brackets 2, radially on the outside with respect to the longitudinal center axis 3, and extend in the circumferential direction. Furthermore, the round connectors 6 are attached to the supporting brackets 2. In the exemplary embodiments shown here, strings 7 are used as attachment devices, and are preferably in the form of glass strings. Furthermore, the round connectors 6 are expediently insulated. Appropriate electrical insulation can be seen in the enlarged illustration in FIG. 3 and FIG. 6 and is annotated 8.

Figure 2:
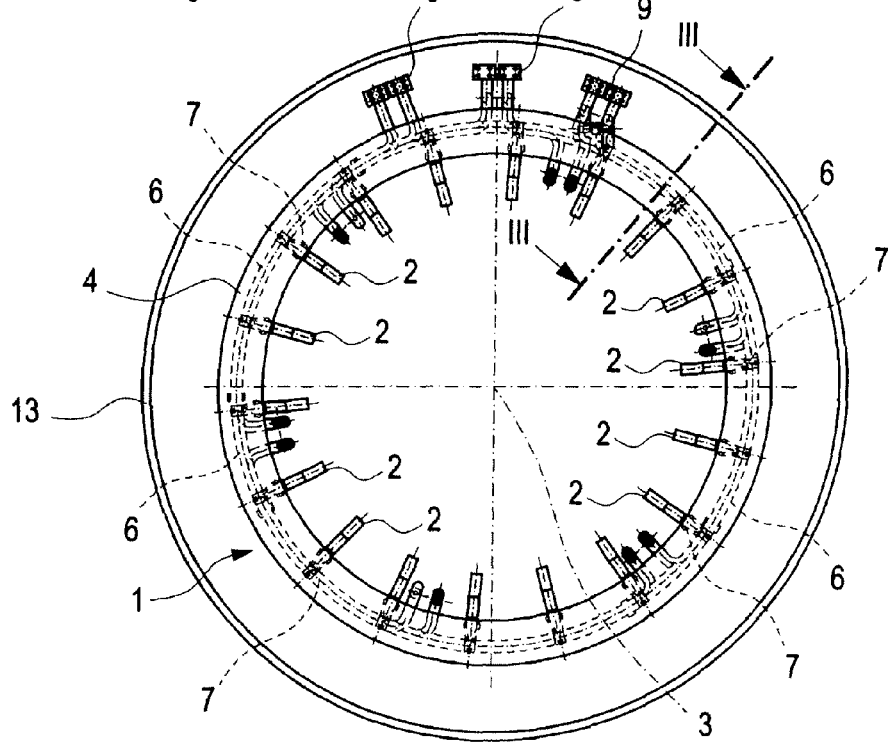
FIG. 2 shows a plan view of the supporting basket with round connectors in the impregnation bath, corresponding to a viewing direction II in FIG. 1.
Figure 3:
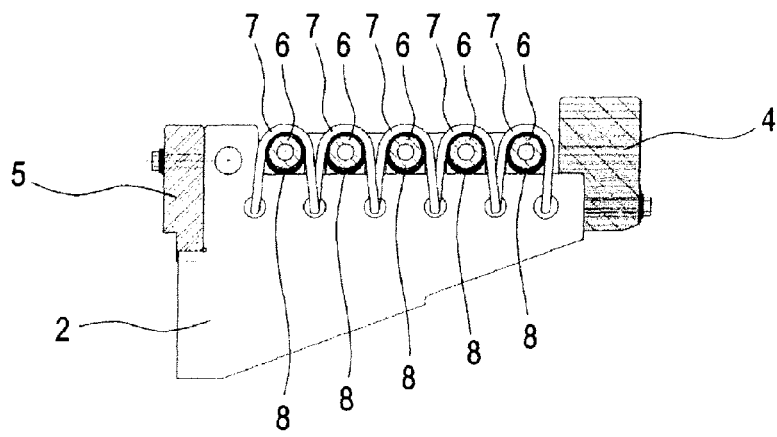
Figure 4:
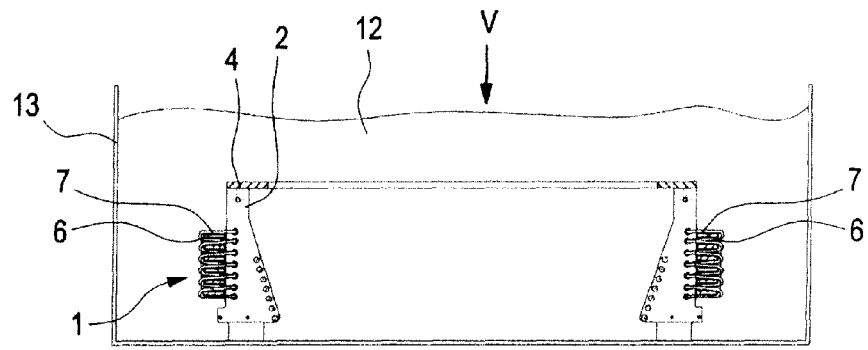
FIG. 4 shows a view as in FIG. 1, but of a different embodiment.
Figure 5:
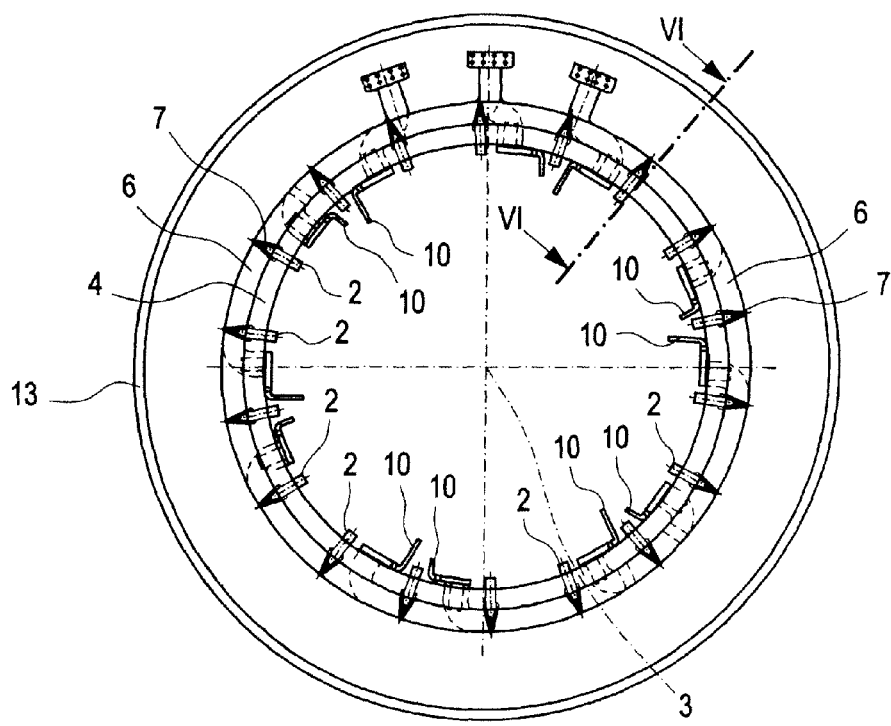
FIG. 5 shows a plan view of the arrangement shown in FIG. 4, corresponding to a viewing direction V in FIG. 4.
Figure 6:
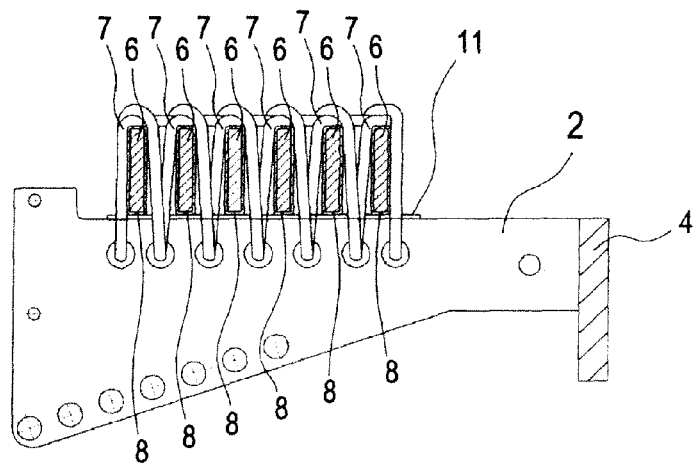
FIG. 6 shows a section view corresponding to the section lines VI in FIG. 5.

In the embodiment shown in FIGS. 1 to 3, the round connectors 6 have a hollow profile, by way of example. In addition, by way of example here, they have a round cross section, in particular a circular cross section. In contrast to this, the round connectors 6 in the embodiment shown in FIGS. 4 to 6 have a solid profile and, by way of example, have a rectangular cross section. Other cross-sectional profiles are likewise feasible, for example a square cross section. The round connectors 6 with a rectangular profile can likewise be hollow. The round connectors 6 with a round or circular cross section can also likewise have a solid profile.

The supporting basket 1 is used for fitting to a stator of an electrical machine, which is preferably a generator. However, it may also in principle be an electric motor. The stator has a stator winding which is passed out of the stator at at least one axial end of the stator, where it forms an end winding. This end winding must be supported. The supporting basket 1 is used for this purpose. The end winding is in this case conventionally formed by winding bar end sections which project axially out of the axial end of the stator, where they are bent outwards in the radial direction and in the circumferential direction, in order to form a truncated conical assembly there, whose cross section widens as the distance from the stator end increases. The end winding formed in this way is then supported radially on the outside by the supporting basket. In the fitted state, and depending on the embodiment, an axial support can also be provided for the end winding on the stator end with the aid of the supporting basket 1. In particular, in this case, the supporting brackets 2 can be supported axially on the stator end. Furthermore, radial forces can be absorbed via the supporting rings 4, 5. Depending on the embodiment of the round connectors 6, these can likewise absorb forces radially, and can thus contribute to making the supporting basket 1 more robust.

With regard to the fitting position on the stator, the supporting basket shown in FIGS. 1 to 3 has a supporting ring 4 which is located axially on the outside, that is to say an outer supporting ring 4, and a supporting ring 5 which is located axially on the inside, that is to say an inner supporting ring 5. The outer supporting ring 4 engages radially over the supporting brackets 2, thus allowing them to be supported thereon in the radial direction. In contrast to this, the embodiment of the supporting basket 1 illustrated in FIGS. 4 to 6 has only one outer supporting ring 4, which is located axially on the outside. This is in this case fitted axially to the supporting brackets 2. The round connectors 6 are used to electrically connect the winding bar end sections in a predetermined manner, in order in this way to form electrical connections 9. For this purpose, the round connectors 6 are connected in a suitable manner to the bar ends of the winding bar sections. By way of example, appropriate connecting pieces can be seen in FIG. 5, and are annotated 10.

The supporting basket 1 is preferably produced as follows:

First of all, the round connectors 6 are insulated. This is preferably done using dry insulation. By way of example, insulation strips which work using mica as the insulation material, so-called mica insulation strips, are suitable for dry insulation.

The supporting brackets 2 are arranged distributed over the circumference independently of the insulation 8 on the round connectors 6, and are firmly connected to one supporting ring 4 or to both supporting rings 4, 5. This results in a framework to which the insulated round connectors 6 can be fitted. This is then the next step. The insulated round connectors 6 are fitted to the framework, which is held together by the at least one supporting ring 4, 5 and is composed of the supporting brackets 2. In this case, the round connectors 6 are attached to the supporting brackets 2, preferably using the strings 7 that are shown here. Furthermore, the round connector ends can also be attached to one another, for example in order to form the connections 9.

If the round connectors 6 have hollow profiles, the open ends must be appropriately sealed, for example by suitable plugs. If the supporting basket 1 has mechanical interfaces which do not need to be impregnated, then these can be covered with an appropriate coating. As can also be seen from FIG. 6, the round connectors 6 can be supported via special cushions 11 on the supporting brackets 2. This makes it possible to reduce the load on the round connectors 6.

The supporting basket 1 which has been prepared in this way and has been completely assembled from the mechanical point of view, can then be immersed in an impregnation agent bath 12, which is accommodated in an appropriate pool 13.

In order now to make it possible to wet all of the insulation 8 and strings 7 on the supporting basket 1, to be impregnated as completely as possible with the impregnation agent, the impregnation agent bath 12 is additionally evacuated. By way of example, the pool 13 is for this purpose closed by a cover, which is not shown here, and is connected to an appropriate vacuum-pressure source. Air enclosures are thus removed, thus making it possible to achieve the desired homogeneous wetting.

After the evacuation process, the supporting basket 1, which has been impregnated to this extent, is then removed from the impregnation agent bath 12 and is passed to a drying process or a curing process. By way of example, the drying or curing of the impregnation agent is carried out in an appropriate oven.

Once the impregnation agent has been cured, the supporting basket 1 is complete. It is characterized in particular in that its round connectors 6 are dip-impregnated in the assembled state, that is to say with the supporting brackets 2 and the corresponding attachment devices.

The complete supporting basket 1 can be fitted to the stator, once the impregnation has cured. The end winding can then be fitted during the winding of the stator, and can be electrically connected to the round connectors 6.

In the assembled state, the longitudinal center axis 3 of the supporting basket 1 then coincides with a rotation axis of a rotor of the electrical machine.

LIST OF REFERENCE SYMBOLS

1 Supporting basket
2 Supporting bracket
3 Longitudinal center axis
4 Outer supporting ring
5 Inner supporting ring
6 Round connector
7 String
8 Insulation
9 Connection
10 Connecting piece
11 Cushion
12 Impregnation agent bath
13 Pool While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for production of a supporting basket for an end winding of a stator winding of an electrical machine, the method comprising:
   preassembling the supporting basket;
   mounting electrically insulated round connectors on the supporting basket;
   immersing the supporting basket with the mounted round connectors in an impregnation agent bath;
   evacuating the impregnation agent bath;
   removing the supporting basket with the mounted round connectors from the impregnation agent bath;
   curing, drying, or both, an impregnation formed on the supporting basket with the mounted round connectors; and
   mounting the supporting basket with the round connectors on a stator, after said curing, drying, or both.

2. The method as claimed in claim 1, further comprising:
   producing the stator winding for the supporting basket, the stator winding including winding bar end sections which form an end winding of the stator winding; and
   connecting winding bar end sections to the round connectors.

3. The method as claimed in claim 1, wherein mounting electrically insulated round connectors comprises mounting on the exterior of the supporting basket.

* * * * *